(12) United States Patent
Gong et al.

(10) Patent No.: US 11,319,697 B2
(45) Date of Patent: May 3, 2022

(54) WATER DISCHARGING DEVICE

(71) Applicant: XIAMEN SOLEX HIGH-TECH INDUSTRIES CO., LTD., Xiamen (CN)

(72) Inventors: Hailang Gong, Xiamen (CN); Huixiang Chen, Xiamen (CN); Shilong Wu, Xiamen (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 205 days.

(21) Appl. No.: 16/449,697

(22) Filed: Jun. 24, 2019

(65) Prior Publication Data
US 2020/0002925 A1     Jan. 2, 2020

(30) Foreign Application Priority Data

Jul. 2, 2018    (CN) .......................... 201810708427.5

(51) Int. Cl.
*E03C 1/084*     (2006.01)
*B05B 7/04*      (2006.01)
(Continued)

(52) U.S. Cl.
CPC ................ *E03C 1/084* (2013.01); *B05B 1/14* (2013.01); *B05B 7/0425* (2013.01); *E03C 1/08* (2013.01); *E03C 1/086* (2013.01)

(58) Field of Classification Search
CPC . E03C 1/08; E03C 1/084; E03C 1/086; B05B 7/0425; B05B 1/14; B05B 1/3405; B05B 1/3436
(Continued)

(56) References Cited

U.S. PATENT DOCUMENTS 3,239,152 A * 3/1966 Bachli .................... E03C 1/084
                                                        239/590
3,298,614 A * 1/1967 Aghnides ............... E03C 1/084
                                                        239/428.5
(Continued)

FOREIGN PATENT DOCUMENTS

CN       203389782 U     1/2014
KR       20120048302 A   5/2012
KR       20120122843 A   11/2012

OTHER PUBLICATIONS

Singh et al., "Effect of Nozzle Geometry on Critical-Subcritical Flow Transitions", Nov. 2018, Heliyon (Year: 2018).*
The EESR dated Oct. 30, 2019 by the EPO.

*Primary Examiner* — Steven J Ganey
(74) *Attorney, Agent, or Firm* — Qinghong Xu

(57) ABSTRACT

The present invention provides a water discharging device, including: a housing; a dispenser disposed at an upper portion of the housing or embedded at an upper end of the housing, water flow entering the interior of the housing through the dispenser; a filter provided at an inlet end of the housing, the water flow entering the dispenser first passing through the filter to remove impurities in the water entering the dispenser; the dispenser includes a plurality of dispensing holes each having an inlet section and an outlet section along a water flow direction, the inlet section including a water outlet having a diameter smaller than a diameter of the outlet section.

13 Claims, 19 Drawing Sheets

(51) Int. Cl.
*B05B 1/14* (2006.01)
*E03C 1/086* (2006.01)
*E03C 1/08* (2006.01)

(58) Field of Classification Search
USPC ..... 239/8, 428.5, 553.3, 462, 467, 491–497, 239/590–590.5, 575, 432, DIG. 23
See application file for complete search history.

(56) References Cited

U.S. PATENT DOCUMENTS

| | | | |
|---|---|---|---|
| 4,657,186 A * | 4/1987 | Shapiro | B05B 1/14 239/462 |
| 5,897,062 A * | 4/1999 | Enomoto | B05B 1/02 239/590 |
| 2012/0067979 A1 | 3/2012 | Kim | |
| 2013/0082122 A1* | 4/2013 | Stein | E03C 1/086 239/428.5 |
| 2014/0203107 A1* | 7/2014 | Lacher | E03C 1/084 239/428.5 |
| 2015/0102133 A1* | 4/2015 | Tempel | E03C 1/084 239/428.5 |
| 2015/0129684 A1* | 5/2015 | Hart | E03C 1/084 239/428.5 |
| 2019/0271138 A1* | 9/2019 | Onodera | E03C 1/084 |
| 2019/0330829 A1* | 10/2019 | Juan | B01F 3/04503 |
| 2020/0407955 A1* | 12/2020 | Keel | E03C 1/084 |

* cited by examiner

WATER DISCHARGING DEVICE

CROSS-REFERENCE TO RELATED APPLICATIONS

This application is related to, and claims the benefit of priority of, CN Application No. 201810708427.5, entitled WATER DISCHARGING DEVICE, filed on Jul. 2, 2018, the contents of which are incorporated herein by reference in their entirety for all purposes.

TECHNICAL FIELD

The present application relates to a water discharging device, and more particularly to a water discharging device capable of generating microbubbles.

BACKGROUND

In the conventional water discharging device which provide water flow with bubbles, an air suction hole is disposed at the annular wall of the housing, and the water flows from the dispenser to the housing to form a negative pressure inside the housing, which negative pressure causes external air to be drawn into the housing from the suction holes at the annular wall of the housing, such that the water flowing into the dispenser is sufficiently mixed with the air drawn from outside to form bubbled water.

Recently, it has been found through researches that a water flow containing microbubbles (referred to as microbubble water) has a better user experience and is favored by more and more users. For example, for water flows of the same volume, a water flow with rich microbubbles may improve the cleaning effect in applications such as rinsing or bathing, compared to a water flow without microbubbles. As for a large number of microbubbles, on the other hand, the water flowing from the microbubble generator device into the container is rich in microbubbles, such that water in the entire container presents as milky white, and such milky white water may be maintained for a period of time. This visual appearance effectively improves the user experience.

Therefore, it is necessary to provide a water discharging device capable of efficiently generating microbubbles by using water flow to satisfy the user's requirements.

SUMMARY

In view of the above, the present invention provides a water discharging device including: a housing; a dispenser disposed at an upper portion of the housing or embedded at an upper end of the housing, water flow entering the interior of the housing through the dispenser; a filter provided at an inlet end of the housing, the water flow entering the dispenser first passing through the filter to remove impurities in the water entering the dispenser; the dispenser includes a plurality of dispensing holes each having an inlet section and an outlet section along a water flow direction, the inlet section including a water outlet having a diameter smaller than a diameter of the outlet section.

jet regulation device jet regulation device jet regulation device regulation ring regulation ring The solution of the present invention intends to provide a water discharging device for generating microbubbles, and the water discharging device is not required to provide any suction holes on the housing. Therefore, the production process is simplified, the difficulty of mold development is decreased, and the cost is reduced.

BRIEF DESCRIPTION OF THE DRAWINGS

Exemplary embodiments of the present invention will be described in detail below with reference to the accompanying drawings, in which.

LIST OF REFERENCE NUMBERS

Figure 1:
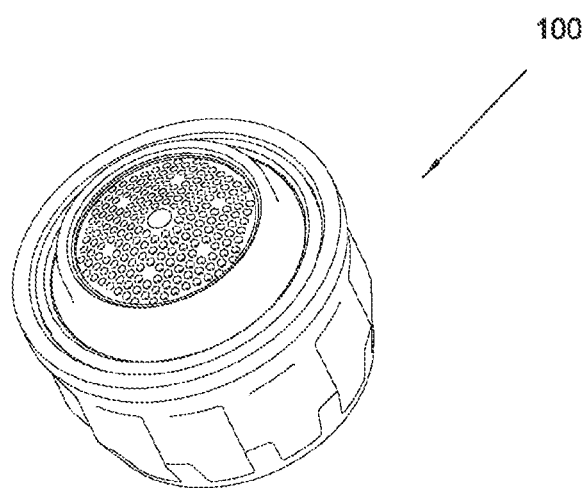
FIG. 1 and FIG. 2 are perspective views showing a water discharging device according to a first embodiment of the present application.

100, 200, 300, 400 water discharging device
110, 210, 310, 410 housing
111, 311 regulation mesh
112 columnar regulation member 120, 320 filter screen
130, 330 jet regulation device
131 regulation ring
133 bracket
140, 240, 340, 440 dispenser
141, 241, 341, 441 dispensing hole
142, 242, 342, 442 inlet section
143, 243, 343, 443 outlet section
144 step portion
145 cylindrical hole
146, 246, 346 flare opening
344 first outlet section
345 second outlet section
150 restrictor
160 washer
170, 270, 370, 470 filter

DETAILED DESCRIPTION

Although the present invention is illustrated and described herein with reference to the particular embodiments, the present invention should not be limited to the details shown. Rather, many modifications may be made to these details without departing from the present invention and within the scope of the equivalent solution of the claims.

The directional descriptions such as "front", "rear", "upper" and "lower" mentioned herein are only intended to conveniently understand. The present invention is not limited to these directions, but may be adjusted according to the actual application.

Throughout the description of the present application, the term "diameter" refers to a diameter or an equivalent diameter of a certain shape. For example, for a circle, the "diameter" is a diameter of the circle, and for a geometric shape other than a circle, the term "diameter" refers to an equivalent diameter, that is, a diameter of a circle having an area equal to the geometric shape.

Figure 2:
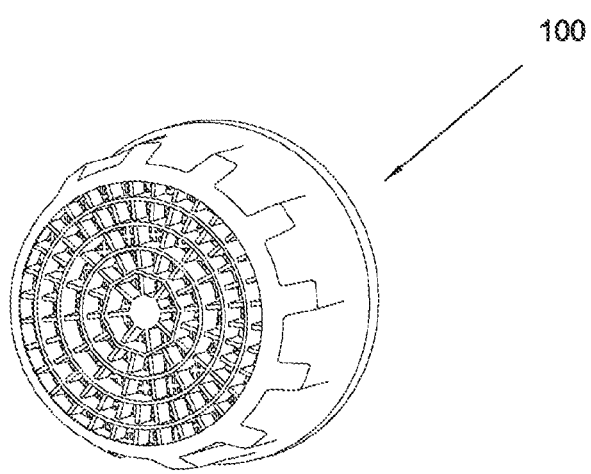
Figure 3:
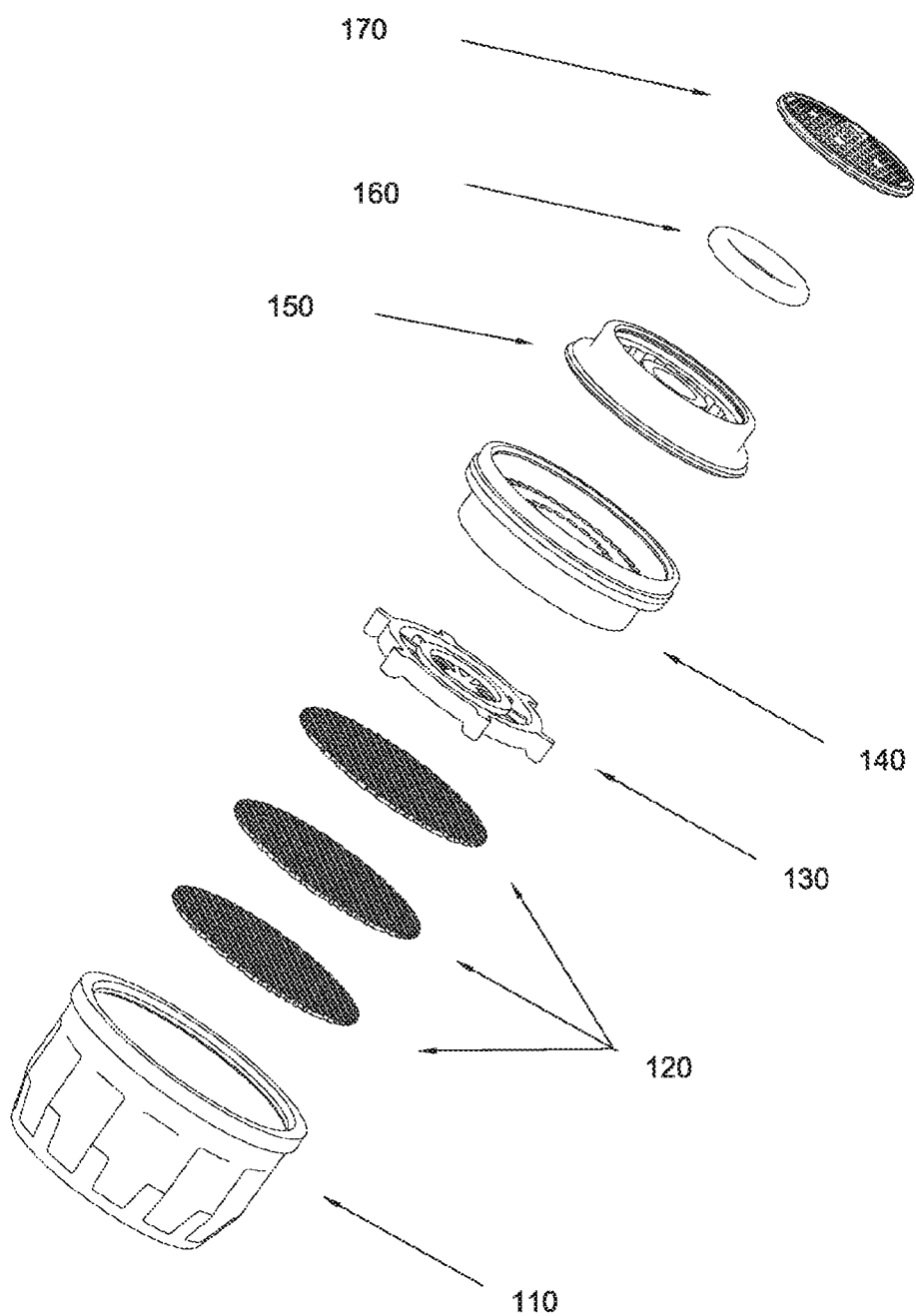
FIG. 3 is an exploded perspective view showing the water discharging device according to the first embodiment of the present application.

Firstly, a first embodiment of a water discharging device according to the present application is described. FIG. 1 and FIG. 2 each shows a general perspective view of the water discharging device 100 of the first embodiment, and FIG. 3 shows an exploded perspective view of the water discharging device 100. As shown in the drawings, the water discharging device 100 includes a housing 110, a filter screen 120, a jet regulation device 130, a dispenser 140, a restrictor 150, a washer 160, and a filter 170.

It should be noted that the filter screen 120, the restrictor 150, and the washer 160 are not necessary, and may be selectively provided as required, wherein the filter screen 120 may be provided as plural according to the actual application.

Figure 4:
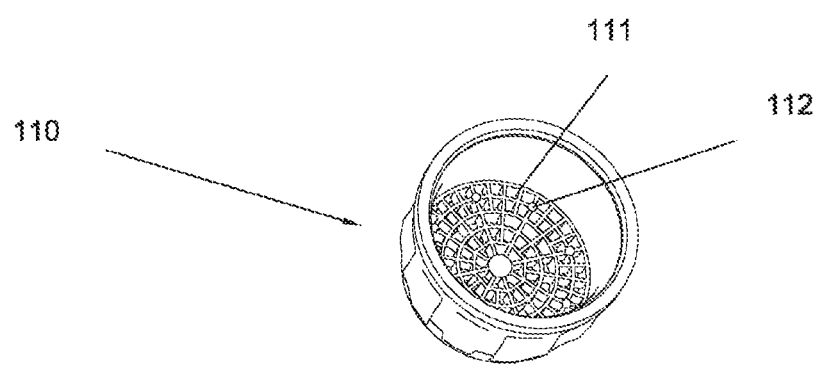
FIG. 4 is a perspective view showing a housing of the water discharging device according to the first embodiment of the present application.

The features of the housing 110 are now described with reference to FIG. 4. The housing 110 defines the appearance of the water discharging device 100 and contains various components of the water discharging device 100. The housing 110 has a generally annular or sleeve-like shape in the present embodiment, however it may be provided in other shapes as demanded. One end (e.g., the water inlet end) of the housing 110 is opened to install various components of the water discharging device 100 inside the housing 110. The other end (e.g., the water outlet) of the housing 110 includes a regulation mesh 111. The regulation mesh 111 includes a circumferential mesh portion and a radial mesh portion, wherein the circumferential mesh portion may include a plurality of layers, each of which may be circular or polygonal; the radial mesh portion may be linear or curved, and may extend along a part or entire diameter of the regulation mesh 111; an intersection between the circumferential mesh portion and the radial mesh portion has a columnar jet regulation device 112 extending in the water flow direction. The regulation mesh 111 functions to facilitate the formation of a plurality of integral water flows from the water discharge flow of the water discharging device 100, thereby improving the user's visual experience.

Figure 5:
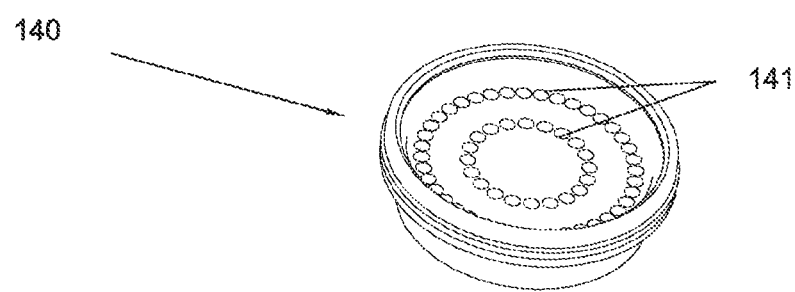
FIG. 5 is a perspective view showing a dispenser of the water discharging device according to the first embodiment of the present application.

The features of the dispenser 140 are now described with reference to FIG. 5. The dispenser 140 is installed in the housing 110 at the water inlet end of the housing 110, and the water flow enters the interior of the housing 110 through the dispenser 140. The outer circumference of the dispenser 140 may be fitted to the water inlet end of the housing 110 and form a watertight joint, forcing the water flow to pass through a dispensing hole 141 in the dispenser 140. The dispensing hole 141 is a hole penetrating through the dispenser 140, which may be provided as plural, and may be arranged in a ring on the dispenser 140 (for example, arranged in an inner ring and an outer ring). As required, the dispensing hole 141 may also adopt other arrangements, such as linear arrangement, symmetric arrangement, eccentric arrangement, or the like. The function of the dispenser 140 is to generate a large number of microbubbles in the water by the special structure of the dispensing hole 141, and the characteristics and technical effects of the dispensing hole 141 will be described in detail later.

Figure 6:
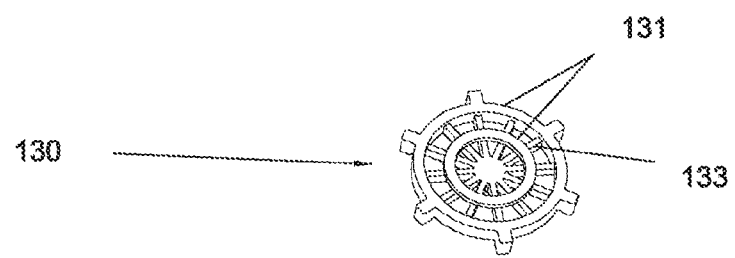
FIG. 6 is a perspective view showing a jet regulation device of the water discharging device according to the first embodiment of the present application.

The features of the jet regulation device 130 are now described with reference to FIG. 6. The jet regulation device 130 is received in the housing 110 and downstream the dispenser 140. In the case that the water discharging device 100 has a filter screen 120, the filter screen 120 may be disposed between the jet regulation device 130 and the housing 110. The jet regulation device 130 includes a plurality of concentrically arranged regulation rings 131 corresponding to the positions of the circularly distributed dispensing holes 141 in the dispenser 140, and a bracket 133 that connects with and supports the regulation ring 131. Although FIG. 6 shows that the jet regulation device 130 has a regulation ring 131 and a bracket 133, it will be understood that the jet regulation device 130 may also be provided as another structure, so as to correspond to the position of the dispensing hole 141 of the dispenser 140.

Figure 7:
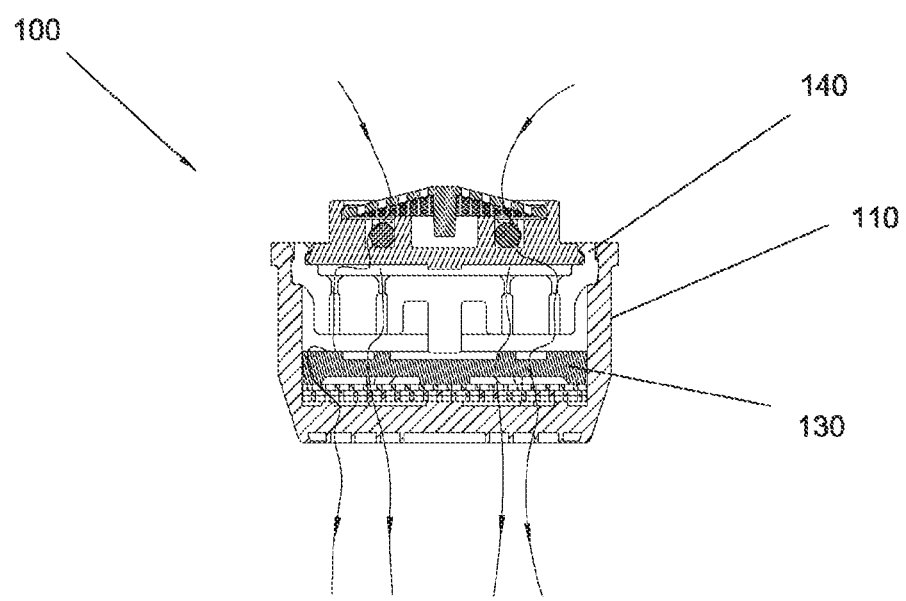
FIG. 7 is a cross-sectional view showing the water discharging device according to the first embodiment of the present application.

The water flow path of the water discharging device 100 is now described with reference to FIG. 7. As shown, water flows from the inlet end of the housing 110 into the dispenser 140, through the dispensing hole 141 in the dispenser 140, during which process microbubbles are generated; the water flow then flows to the jet regulation device 130, and passes through a gap in the jet regulation device 130, during which process the water is integrated to form a plurality of integral water columns; finally, the water flow is discharged through the water outlet of the housing 110 for the user.

Figure 8:
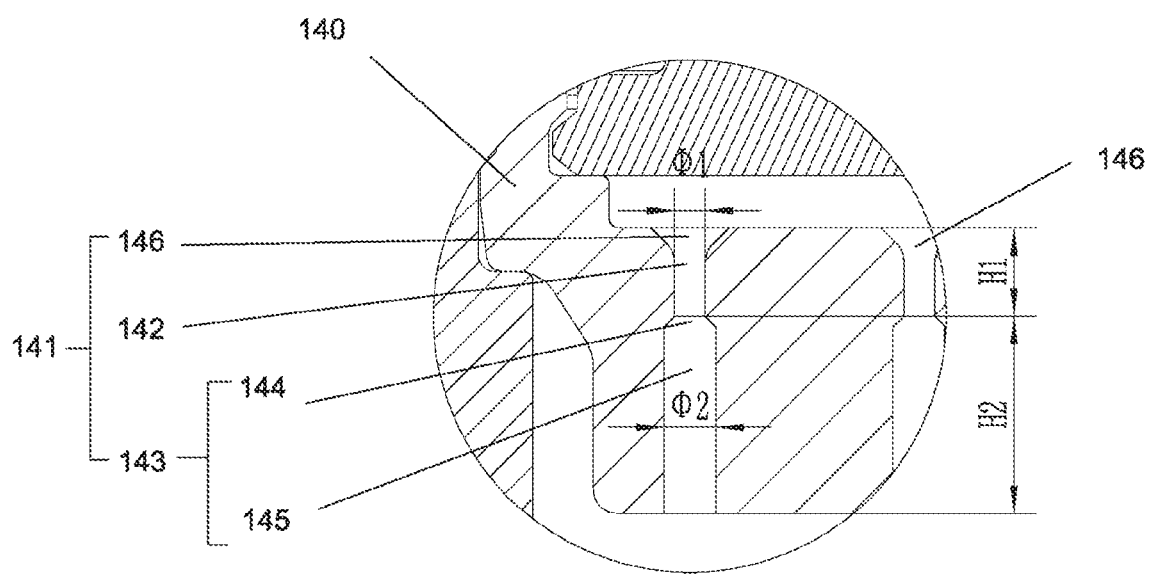
FIG. 8 is a cross-sectional enlarged view showing a portion of the water discharging device according to the first embodiment of the present application.

The features of the dispensing hole 141 will now be described in detail with reference to FIG. 8. As shown, the dispensing hole 141 may be a plurality of holes that extend through the dispenser 140 in the water flow direction, such that the same volume of water has a larger surface area, thereby facilitating the escape of gas in the water. The dispensing hole 141 has an inlet section 142 and an outlet section 143 in sequence in the water flow direction, the inlet section 142 has a water outlet, and a diameter of the water outlet of the inlet section 142 is smaller than a diameter of the outlet section 143. The inlet section 142 has a flare opening 146 having a diameter reduced in the direction of the water flow and a cylindrical straight section, and the water outlet of the inlet section 142 is disposed at the end of the straight section of the inlet section 142.

The inlet section 142 and the outlet section 143 each includes a cylindrical hole, and a diameter of the cylindrical hole of the inlet section 142 is smaller than a diameter of the cylindrical hole of the outlet section 143.

The outlet section 143 includes a step portion 144 and a cylindrical hole 145. The step portion 144 is disposed adjacent to the inlet section 142 and presents as a flared shape that is smaller in upstream and larger in downstream along the water flow direction.

In use, firstly, due to the flared structure of the inlet section 142, the water flow may be prevented from directly striking the inlet surface of the dispenser 140 which leads to a pressure loss as much as possible, thereby maintaining high pressure and flow rate for the water flowing into the dispensing hole 141. Subsequently, due to the smaller diameter of the inlet section 142, the water flow passing into the dispensing hole 141 is accelerated. The water flow flows from the inlet section 142 into the outlet section 143. Since the diameter of the inlet section 142 is smaller than the diameter of the outlet section 143, the flow rate of the water flowing into the outlet section 143 is lowered to form a local negative pressure. As the pressure is lowered, a large amount of gas dissolved in the water escapes to form microbubbles, thereby obtaining a foamy effect.

The water flow flows through the dispenser 140 to the regulation ring 131 of the jet regulation device 130, then converges into the gap formed by the regulation ring 131 and the bracket 133, and then flows through the jet regulation device 130 via the gap. A large number of microbubbles are generated in the water flow when passing through the dispenser 140, and then regulation of the regulation ring 131 finally causes the flowing water to form an integral water column, thus reducing the rupture of the microbubbles in the water, such that the water finally flowing out contains abundant microbubbles. In the case that the filter screen 120 is provided, the filter screen 120 may improve the regulation effect. In other words, through the filter screen 120, the water is merged to form jet streams with a general circular cross-section. The cross-section may be perfectly circular without a defect.

Preferably, the outlet section 143 has a rounded tubular shape, and a ratio of the diameter Ø1 of the water outlet of the inlet section 142 to a diameter Ø2 of the largest end of the outlet section 143 (i.e., the diameter Ø2 of the outlet section) lies in a range of 0.2-0.9. A ratio of the cross-sectional area of the water outlet of the inlet section 142 to the cross-sectional area of the outlet section 143 lies in a range of 0.04-0.81. A ratio of the diameter Ø1 of the water outlet of the inlet section 142 to a sum of heights of the inlet section 142 and the outlet section 143 (H1+H2) lies in a range of 0.05 to 0.3.

It should be noted that, according to the water discharging device 100 of the present application, air bubbles are generated from the water flow itself by the specific configuration of the dispenser 140. Thus, air is unnecessary to be drawn from the outside during the foaming process, i.e., the dispenser 140 and the housing 110 may form a closed space without an intake hole, thereby reducing the risk of air pollution inside the water discharging device 100. Moreover, such a design is advantageous for forming bubbles which has smaller particle size and may be remained in the water for a longer time, and is advantageous for deep cleaning for the skin pores of the user.

Figure 9:
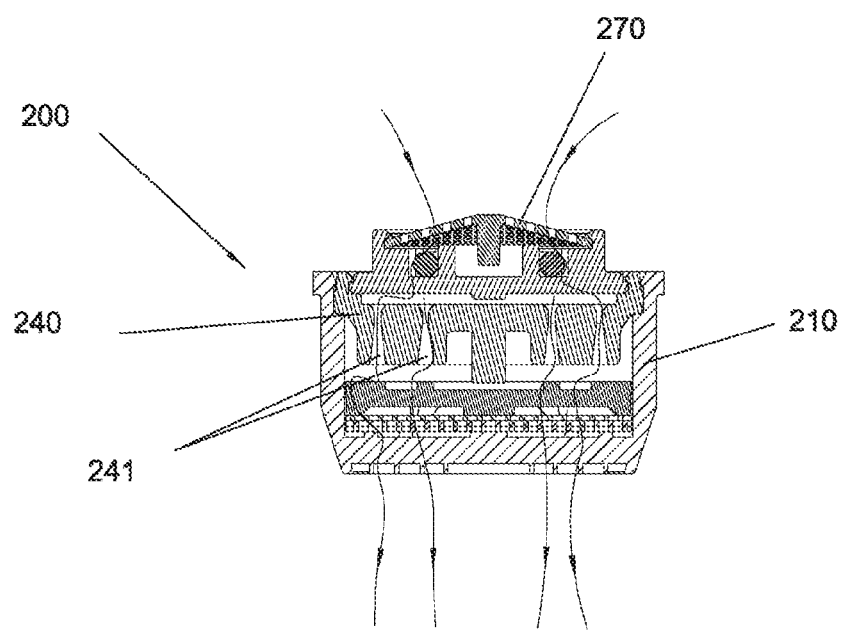
FIG. 9 is a cross-sectional view showing a water discharging device according to a second embodiment of the present application.
Figure 10:
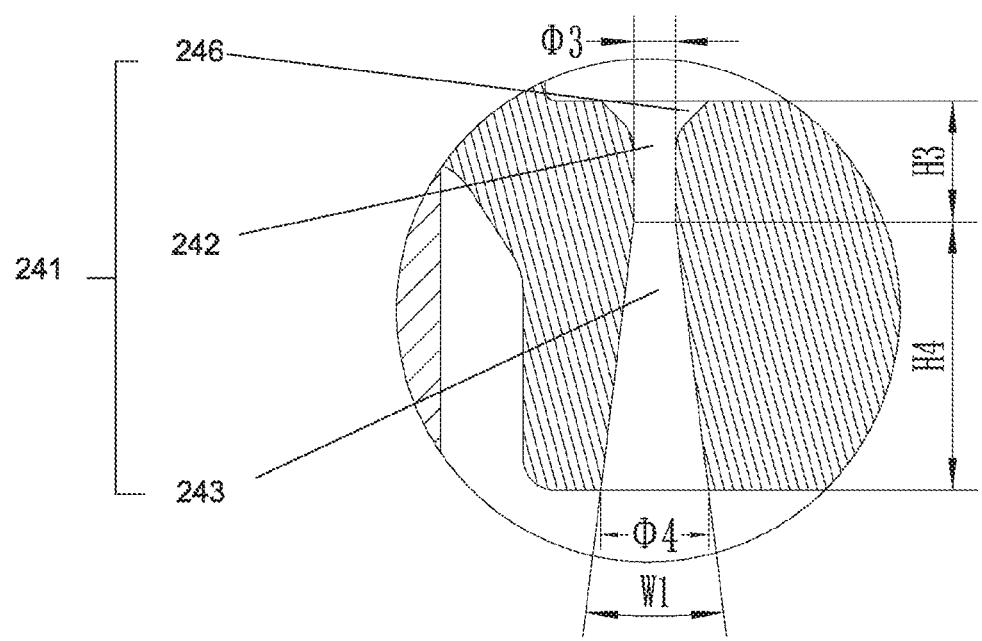
FIG. 10 is a cross-sectional enlarged view showing a portion of the water discharging device according to the second embodiment of the present application.

A water discharging device 200 according to a second embodiment of the present application is now described with reference to FIG. 9 and FIG. 10. As shown, the water discharging device 200 includes components such as a housing 210, a dispenser 240, a filter 270, and etc. The water discharging device 200 is similar to the water discharging device 100, and for the sake of brevity, only the differences between the both are described herein.

The dispenser 240 of the water discharging device 200 has a dispensing hole 241 penetrating through the dispenser 140, which may be provided as plural. The dispensing hole 241 includes an inlet section 242 and an outlet section 243. The inlet section 242 has a water outlet, and a diameter of the water outlet of the inlet section 242 is smaller than a diameter of the outlet section 243. The inlet section 242 has a flare opening 246 that is reduced in diameter in the water flow direction and a cylindrical straight section. Different from the water discharging device 100 of the foregoing embodiment, the outlet section 243 does not include a step portion and a cylindrical hole, but presents as a flared shape in which the diameter of the water inlet is smaller than the diameter of the water outlet. In use, due to the flared structure of the outlet section 243, a certain vacuum is formed in the outlet section 243, and as a result, as the pressure is lowered, a large amount of gas dissolved in the water escapes to form microbubbles, thereby realizing the foaming effect.

Preferably, a ratio of a diameter Ø3 of the water outlet of the inlet section 242 to the largest end diameter Ø4 of the outlet section 243 lies in a range of 0.2-0.9; a ratio of the cross-sectional area of the water outlet of the inlet section 242 to the largest end sectional area of the outlet section 243 lies in a range of 0.04-0.81; and a ratio of the diameter Ø3 of the minimum end of the inlet section 242 to a sum of heights of the inlet section 242 and the outlet section 243 (H3+H4) lies in a range of 0.05 to 0.3.

It should be noted that, according to the water discharging device 200 of the present application, air bubbles are generated from the water flow itself by the specific configuration of the dispenser 240. Thus, air is unnecessary to be drawn from the outside during the foaming process, i.e., the dispenser 240 and the housing 210 may form a closed space without an intake hole, thereby reducing the risk of air pollution inside the water discharging device 200. Moreover, such a design is advantageous for forming bubbles which has smaller particle size and may be remained in the water for a longer time, and is advantageous for deep cleaning for the skin pores of the user.

Figure 11:
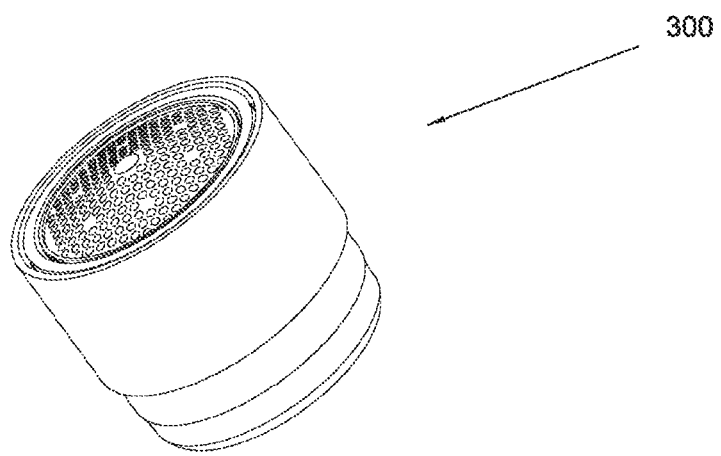
FIG. 11 and FIG. 12 are perspective views showing a water discharging device according to a third embodiment of the present application.
Figure 12:
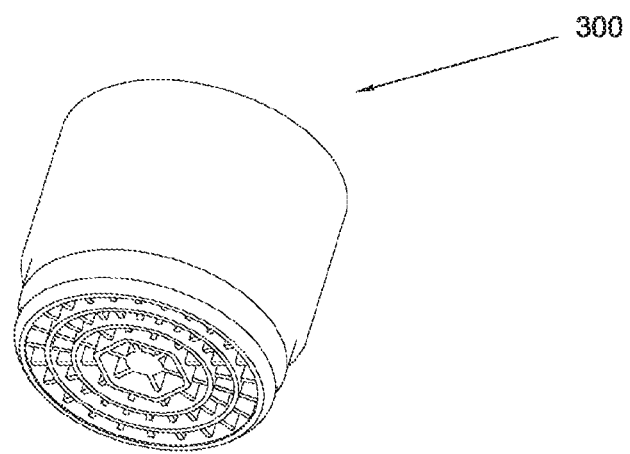
Figure 13:
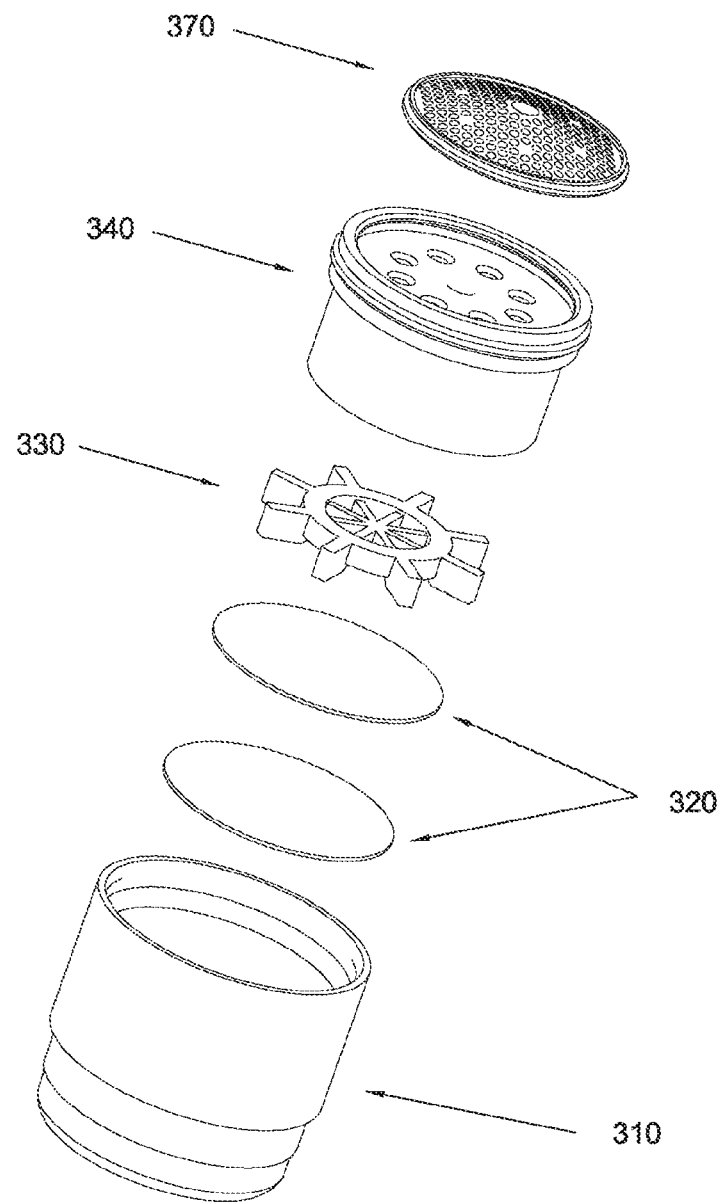
FIG. 13 is an exploded perspective view showing the water discharging device according to the third embodiment of the present application.

A third embodiment of the water discharging device according to the present application will now be described. FIG. 11 and FIG. 12 each shows a general perspective view of the water discharging device 300 of the third embodiment, and FIG. 13 shows an exploded perspective view of the water discharging device 300. As shown, the water discharging device 300 includes a housing 310, a filter screen 320, a jet regulation device 330, a dispenser 340, and a filter 370.

It should be noted that the filter screen 320 is not necessary, and may be selectively installed as demanded, and may be provided as plural according to actual application.

Figure 14:
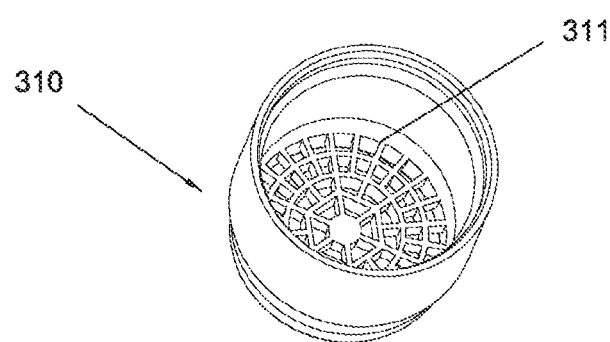
FIG. 14 is a perspective view showing a housing of the water discharging device according to the third embodiment of the present application.

The features of the housing 310 are now described with reference to FIG. 14. The housing 310 defines the appearance of the water discharging device 300 and contains various components of the water discharging device 300. The housing 310 has a generally annular or sleeve-like shape in this embodiment, and may also be provided in other shapes as demanded. One end (e.g., the water inlet end) of the housing 310 is opened to install various components of the water discharging device 300 in the housing 310. The other end (such as the water outlet) of housing 310 includes a regulation mesh 311. The regulation mesh 311 includes a circumferential mesh portion and a radial mesh portion, wherein the circumferential mesh portion may be divided into a plurality of layers, and the radial mesh portion may be linear or curved and may extend over the entire or a portion of the diameter of the regulation mesh 311. Compared to the housing 110 of the water discharging device 100, the housing 310 of the embodiment includes a smaller number of layers of the circumferential mesh portion and does not include a column jet regulation device.

Figure 15:
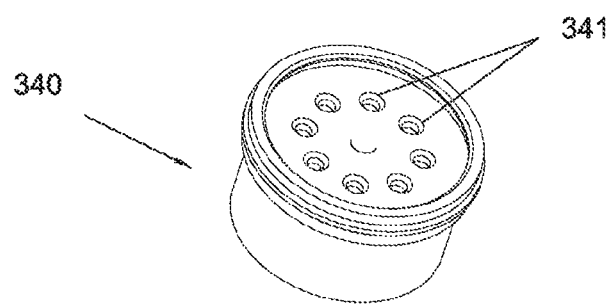
FIG. 15 is a perspective view showing a dispenser of the water discharging device according to the third embodiment of the present application.

The features of the dispenser 340 are now described with reference to FIG. 15. The dispenser 340 is installed in the housing 310 at the water inlet end of the housing 310, and the water flow may enter the interior of the housing 310 through the dispenser 340. The outer circumference of the dispenser 340 may be fitted to the water inlet end of the housing 310 and form a watertight joint, forcing the water to pass through the dispensing hole 341 in the dispenser 340. The dispensing hole 341 is a hole penetrating through the dispenser 340, which may be provided as plural and may be arranged in an annular pattern on the dispenser 340. The figure shows dispensing holes 341 arranged in an annular pattern, however, the dispensing hole 341 may also be arranged in other patterns, such as a linear arrangement, a symmetric arrangement, an eccentric arrangement, and etc.

Figure 16:
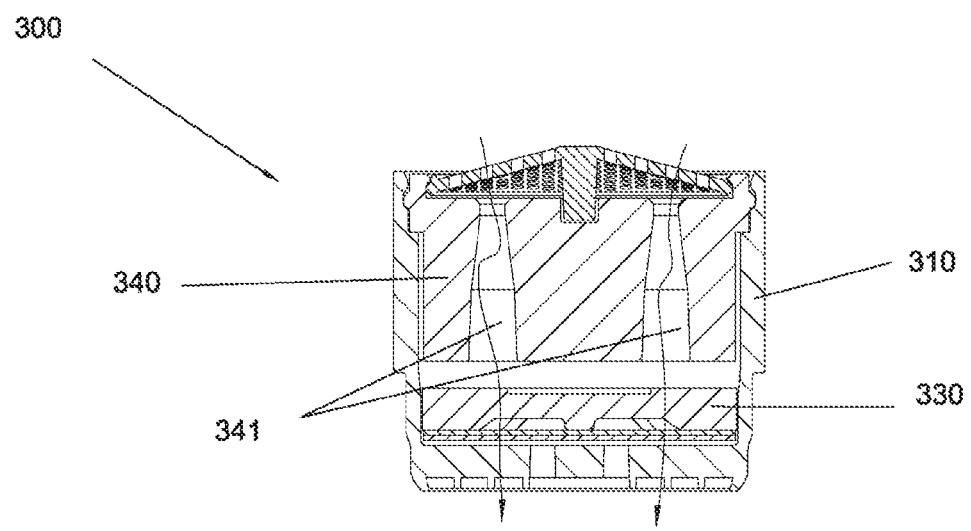
FIG. 16 is a cross-sectional view showing the water discharging device according to the third embodiment of the present application.

The water flow path of the water discharging device 300 is now described with reference to FIG. 16. As shown, water flows from the inlet end of the housing 310 into the dispenser 340, through the dispensing hole 341 in the dispenser 340, during which microbubbles are generated; the water then flows to the jet regulation device 330, and passes through a gap in the jet regulation device 330, during which process the water is integrated to form a plurality of integral water columns; finally, the water flow is discharged through the water outlet of the housing 310 for the user.

Figure 17:
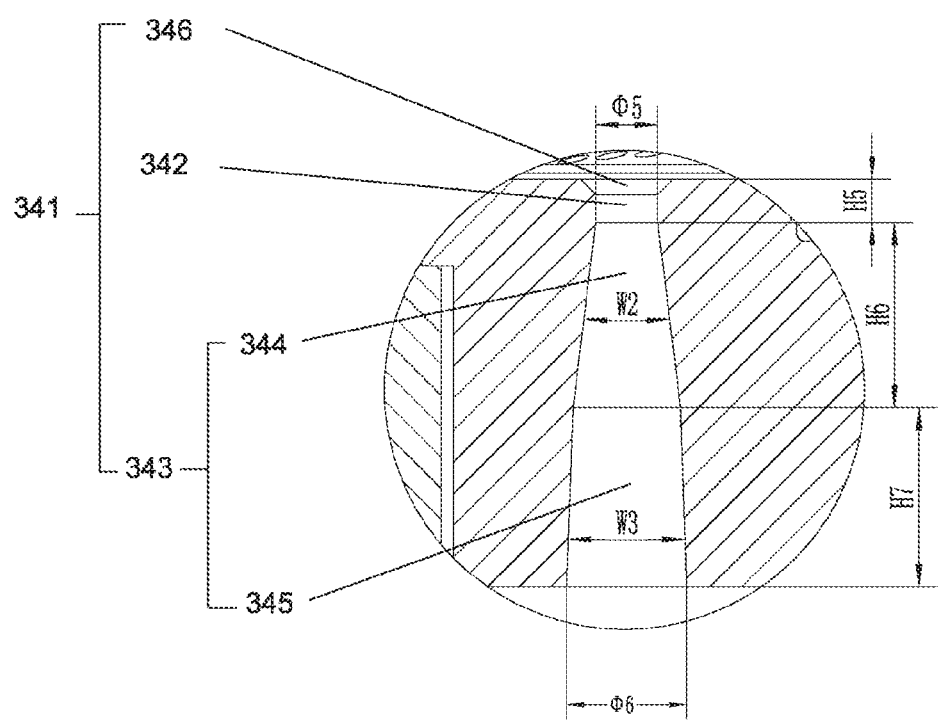
FIG. 17 is a cross-sectional enlarged view showing a portion of the water discharging device according to the third embodiment of the present application.
Figure 18:
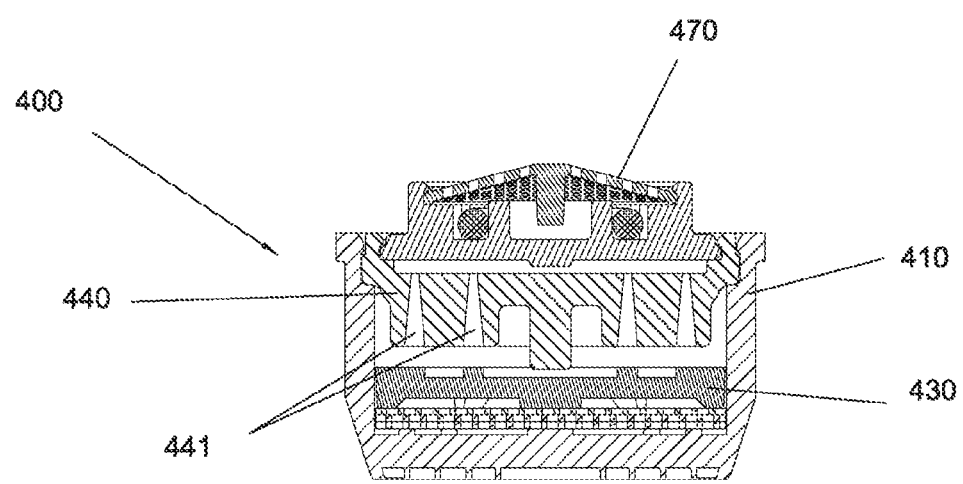
FIG. 18 is a cross-sectional view showing a water discharging device according to a fourth embodiment of the present application.
Figure 19:
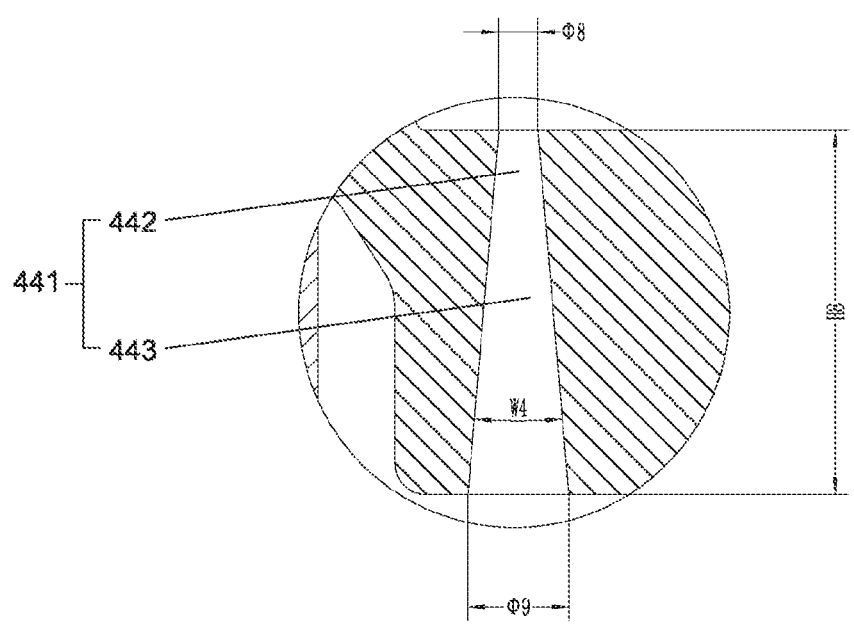
FIG. 19 is a cross-sectional enlarged view showing a portion of the water discharging device according to the fourth embodiment of the present application.

The features of the dispensing hole 341 are now described in detail with reference to FIG. 17. As shown, the dispensing hole 341 is a plurality of holes that extend through the dispenser 340 in the water flow direction, such that the water with the same volume has a larger surface area, thereby facilitating the gas to escape from the water. The dispensing hole 341 has an inlet section 342 and an outlet section 343 in sequence in the water flow direction, the inlet section 342 has a water outlet, and a diameter of the water outlet of the inlet section 342 is smaller than a diameter of the outlet section 343. The inlet section 342 has a flare opening 346 that is reduced in diameter in the water flow direction and a straight section of a cylindrical shape.

The outlet section 343 includes: a tapered first outlet section 344 connected to the inlet section 342; and a tapered second outlet section 345 connected to the first outlet section 344, wherein a taper angle of the first outlet section 344 is different from a taper angle of the second outlet section 345. For example, the taper angle of the first outlet section 344 may be greater than the taper angle of the second outlet section 345.

In use, firstly, due to the flared structure of the inlet section 346, it may prevent the water flow from directly striking the inlet surface of the dispenser 340 which leads to a pressure loss as much as possible, thereby maintaining high pressure and flow rate for the water flowing into the dispensing hole 341. Subsequently, due to the smaller diameter of the inlet section 342, the water flow passing into the dispensing hole 341 is accelerated. Then, due to the tapered structure of the first outlet section 344, the water flow is dissipated and the air solubility in the water is reduced, so that the air in the water may be easily released. Finally, due to function of the second outlet section 345, the water flow from the first outlet section 344 is concentrated and accelerated, increasing the degree of vacuum. Therefore, a certain vacuum is formed in the water outlet cavity, and the pressure of the water flow is significantly reduced, such that the air originally dissolved in the water escapes rapidly and forms microbubbles, thus achieving the foaming effect.

Preferably, a ratio of a diameter Ø5 of the water outlet of the inlet section 342 to a diameter Ø6 of the largest end of the outlet section 343 lies in a range of 0.2-0.9; a ratio of the cross-sectional area of the water outlet of the inlet section 342 to the cross-sectional area of the largest end of the outlet section 343 lies in a range of 0.04-0.81; a ratio of the diameter Ø5 of the straight section of the inlet section 342 to a sum of heights of the inlet section 342 and the outlet section 343 (H5+H6+H7) lies in a range of 0.05-0.3; a taper angle W2 of the first outlet section 344 lies in a range of 3°-15°; and a taper angle W3 of the second outlet section 345 lies in a range of 4°-10°.

It should be noted that, according to the water discharging device 300 of the present application, air bubbles are generated from the water flow itself by the specific configuration of the dispenser 340. Thus, air is unnecessary to be drawn from the outside during the foaming process, i.e., the dispenser 340 and the housing 310 may form a closed space without an intake hole, thereby reducing the risk of air pollution inside the water discharging device 300. Moreover, such a design is advantageous for forming bubbles which has a smaller particle size and may be remained in the water for a longer period of time, and is advantageous for deep cleaning of the skin pores of the user.

A fourth embodiment of the water discharging device according to the present application is now described.

As shown, the water discharging device 400 includes components such as a housing 410, a dispenser 440, a filter 470, and etc. The water discharging device 400 is similar to the water discharging device 200, and for the sake of brevity, only the differences between the both are described herein.

The dispenser 440 of the water discharging device 400 has a dispensing hole 441 penetrating through the dispenser 440, and the dispensing hole 441 may be provided as plural. Unlike the water discharging device 200 of the foregoing embodiment, both the inlet section 442 and the outlet section 443 of the dispensing hole 441 are flared, in which a diameter of the water inlet is smaller than a diameter of the water outlet. In use, due to the flared structure of the inlet section 442 and the outlet section 443, a certain vacuum is formed in the dispensing hole 441, and as a result, as the pressure is lowered, a large amount of gas dissolved in the water escapes to form microbubbles, thereby achieving the foaming effect.

Preferably, a ratio of an inlet diameter Ø8 of the dispensing hole 441 to the total height H8 of the dispensing hole lies in a range of 0.05-0.3; a taper angle of the dispensing hole 441 lies in a range of 3°-20°; a ratio of the diameter Ø8 of the water outlet of the inlet section 442 (i.e., the inlet diameter Ø8 of the dispensing hole 441) to a diameter Ø9 of the largest end of the outlet section 443 (i.e., the exit diameter Ø9 of the dispensing hole 441) lies in a range of 0.2-0.9; and a ratio of the cross-sectional area of the water outlet of the inlet section 442 to the cross-sectional area of the largest end of the outlet section 443 lies in a range of 0.04-0.81.

It should be noted that, according to the water discharging device 400 of the present application, air bubbles are generated from the water flow itself by the specific configuration of the dispenser 440. Thus, air is unnecessary to be drawn from the outside during the foaming process, i.e., the dispenser 440 and the housing 410 may form a closed space without an intake hole, thereby reducing the risk of air pollution inside the water discharging device 400. Moreover, such a design is advantageous for forming bubbles which has smaller particle size and may be remained in the water for a longer period of time, and is advantageous for deep cleaning of the skin pores of the user.

In addition, in various embodiments of the present application, the cross-sectional shape of the dispensing hole may have a circular shape, an elliptical shape, a square shape, a hexagonal shape, an octagonal shape, or the like, or an asymmetrical polygon. In the case that the dispersing hole has a circular cross section, the diameter of each location of the dispensing hole refers to a diameter of the circle. In the case that the dispersing hole is not circular in cross section, the diameter of each location of the dispensing hole refers to an equivalent diameter of the cross section, i.e., the diameter of the circle having the same area as that of the cross section.

In summary, according to various embodiments of the water discharging device of the present application, the bubbled water containing a large amount of microbubbles can be effectively formed by the specially designed dispenser. And with the jet regulation device, the bubbled water may be integrated into a plurality of water flow columns, thus effectively improving the user's perception and experience.

The preferred embodiments has been shown and described herein, however, it should be understood that these embodiments are only intended to be given as examples. Many modifications, changes and substitutions would occur to those skilled in the art without departing from the spirit of the present invention. Therefore, the appended claims are intended to cover all such modifications that fall within the spirit and scope of the present invention.

What is claimed is:

1. A water discharging device, comprising:
   a housing;
   a dispenser disposed at an upper portion of the housing, a water flow entering an interior of the housing through the dispenser;
   a filter provided at an inlet end of the housing, wherein the water flow entering the dispenser first passes through the filter so as to remove impurities in the water entering the dispenser;
   wherein the dispenser includes a plurality of dispensing holes, each dispensing hole having an inlet section and an outlet section along a water flow direction, the inlet section including a water outlet with a diameter smaller than a diameter of the outlet section;
   wherein no air inlet is provided at a circumferential wall of the housing;
   wherein a ratio of the diameter of the water outlet of the inlet section to a diameter of a largest end of the outlet section lies in a range of 0.2 to 0.9; and
   wherein a ratio of a cross-sectional area of the water outlet of the inlet section to a cross-sectional area of the largest end of the outlet section lies in a range of 0.04-0.81.

2. The water discharging device according to claim 1, wherein:
   a ratio of the diameter of the water outlet of the inlet section to a sum of heights of the inlet section and the outlet section lies in a range of 0.05 to 0.3.

3. The water discharging device according to claim 1, wherein:
   the inlet section includes a flare opening which has a diameter decreasing along the water flow direction.

4. The water discharging device according to claim 1, wherein:
   the inlet section and the outlet section each includes a cylindrical hole, and a diameter of the cylindrical hole of the inlet section is smaller than a diameter of the cylindrical hole of the outlet section.

5. The water discharging device according to claim 4, wherein:
   the outlet section further includes a step portion connected to the inlet section, and has a flare shape with a diameter of a water inlet smaller of the outlet section than a diameter of a water outlet of the outlet section.

6. The water discharging device according to claim 1, wherein:
   the outlet section has a flare shape with a diameter of a water inlet of the outlet section smaller than a diameter of a water outlet of the outlet section.

7. The water discharging device according to claim 1, wherein:
   the outlet section includes: a first outlet section which is tapered and connected to the inlet section; and a second outlet section which is tapered and connected to the first outlet section, wherein a taper angle of the first outlet section is different from a taper angle of the second outlet section.

8. The water discharging device according to claim 7, wherein:
   the taper angle of the first outlet section lies in a range of 3°-15°; and
   the taper angle of the second outlet section lies in a range of 4°-10°.

9. The water discharging device of claim 1, further comprising:
   a jet regulation device accommodated in the housing and downstream of the dispenser, and a filter screen disposed between the jet regulation device and the housing;
   wherein the jet regulation device includes:
   a plurality of regulation rings concentrically arranged to correspond to locations of the dispensing holes in the dispenser, the dispensing holes being circularly distributed; and
   a bracket connecting with and supporting the regulation rings.

10. The water discharging device according to claim 1, wherein:
    the inlet section and the outlet section each has a flare shape with a diameter of a water inlet smaller than a diameter of a water outlet.

11. The water discharging device according to claim 10, wherein:
    a ratio of an inlet diameter of the dispensing hole to a total height of the dispensing hole lies in a range of 0.05-0.3; a taper angle of the dispensing hole lies in a range of 3°-20°; and a ratio of the inlet diameter of the dispensing hole to an outlet diameter of the dispensing hole lies in a range of 0.2-0.9.

12. A water discharging device, comprising:
    a housing;
    a dispenser disposed at an upper portion of the housing, a water flow entering an interior of the housing through the dispenser;

a filter provided at an inlet end of the housing, wherein the water flow entering the dispenser first passes through the filter so as to remove impurities in the water entering the dispenser;

wherein the dispenser includes a plurality of dispensing holes, each dispensing hole having an inlet section and an outlet section along a water flow direction, the inlet section including a water outlet with a diameter smaller than a diameter of the outlet section;

wherein no air inlet is provided at a circumferential wall of the housing; and wherein a ratio of the diameter of the water outlet of the inlet section to a sum of heights of the inlet section and the outlet section lies in a range of 0.05 to 0.3.

13. A water discharging device, comprising:

a housing;

a dispenser disposed at an upper portion of the housing, a water flow entering an interior of the housing through the dispenser;

a filter provided at an inlet end of the housing, wherein the water flow entering the dispenser first passes through the filter so as to remove impurities in the water entering the dispenser;

wherein the dispenser includes a plurality of dispensing holes, each dispensing hole having an inlet section and an outlet section along a water flow direction, the inlet section including a water outlet with a diameter smaller than a diameter of the outlet section;

wherein no air inlet is provided at a circumferential wall of the housing;

wherein the outlet section includes: a first outlet section which is tapered and connected to the inlet section; and a second outlet section which is tapered and connected to the first outlet section, wherein a taper angle of the first outlet section is different from a taper angle of the second outlet section;

wherein the taper angle of the first outlet section lies in a range of 3°-15°; and wherein the taper angle of the second outlet section lies in a range of 4°-10°.

* * * * *